Oct. 21, 1930.   G. H. BAUSMAN   1,779,225
PISTON ROD PACKING
Filed Jan. 5, 1929

Inventor
George H. Bausman
By Edwin T. Hummel
Attorney

Witnesses

Patented Oct. 21, 1930

1,779,225

UNITED STATES PATENT OFFICE

GEORGE H. BAUSMAN, OF BALTIMORE, MARYLAND

PISTON-ROD PACKING

Application filed January 5, 1929. Serial No. 330,445.

The invention relates to a combined metal and fiber packing for the piston rods of steam engines, water pumps, pumps handling oil or acids, also air compressors and refrigerating machines, and for any purpose where a semi-metallic packing ring, the packing surfaces, being the inner and outer peripheral surfaces, can be used. The packing surfaces of the packing ring of the invention are formed in part at least of soft packing which makes a soft contact with the cylindrical surfaces of the stuffing box or gland on one side and the piston rod on the other side completely eliminating all leakage around the piston rod and through the gland or box.

This soft packing material may be of any preferred variety, it having been found that for use with steam engines and air pumps asbestos fiber is most effective, with water pumps, refrigerating machines using ammonia and with pumps handling acid a rubber filler or soft packing may be used. With pumps used for water a filler of flax is satisfactory and in handling oil, cork or leather is best for the soft packing element.

In the accompanying drawings I have illustrated a piston rod or similar packing embodying the features of my invention in the preferred form.

Figure 3:
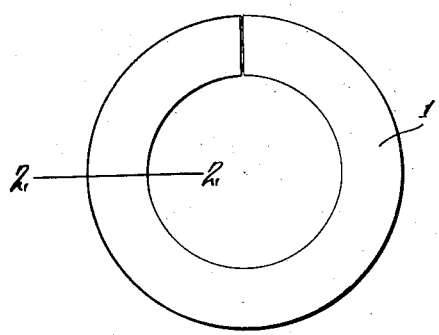
Figure 3 is a plan on a reduced scale of a packing ring of this material, the section Figure 2 being treated as taken on the line 2—2 of Figure 3.
Figure 2:
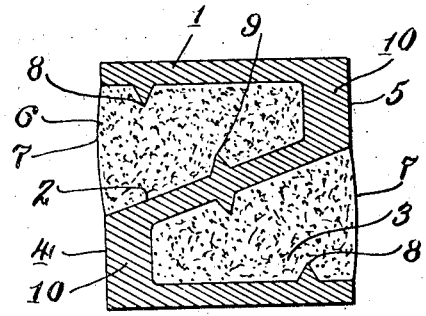
Figure 2 is a cross section through the completed packing consisting of the metal strip and soft filler.
Figure 4:
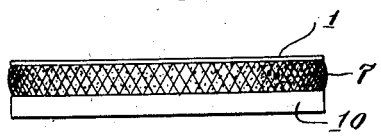
Figure 4 is a side elevation of the packing ring shown in Figure 2.
Figure 1:
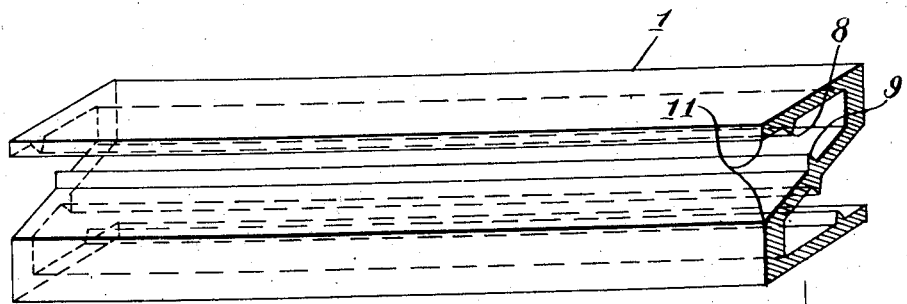
Figure 1 is a perspective view of the metallic form or strip before bending and without the fibrous or other soft packing filler.
Figure 5:
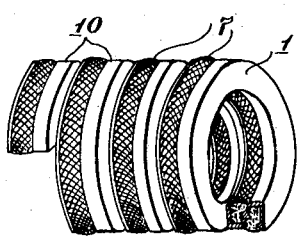
Figure 5 is a perspective view of a helical coil of the packing.

Referring to the drawings by numerals each of which is used to indicate the same or similar parts in the different figures, the packing as shown consists of a metallic strip or form 1 the cross section of the strip as shown in Figure 2 being described as of Z shape, in that it is formed with oppositely disposed grooves 2 and 3, the cross section of the grooves being tapered to give them an increasing width toward the mouth at 11. One groove 2 opens outwardly through the outer peripheral surface 4 of the strip and the groove 3 opens inwardly through the inner peripheral surface 5 of the strip. The grooves 2 and 3 are filled with soft packing 6 of any preferred type as already outlined, the strips being preferably formed by forcing a soft metal, as lead, or alloy through a die.

In the preferred form illustrated the fibrous or other soft packing material 6 which fills the grooves is preferably of a normal bulk slightly greater than the volume of the space within the corresponding grooves so that particularly when the ring is compressed in a stuffing box the soft packing material bulges outward slightly from the grooves as indicated at 7 providing a bearing surface of the soft material which at the outer peripheral surface of the packing strip engages the cylindrical wall of the gland and the inner surface of the strip engages the cylindrical surface of the piston rod. To hold the soft packing in position in the grooves, these grooves are preferably provided with any suitable keys 8—9 shown as extending longitudinally of the strip and projecting from the opposite side walls into the grooves. While the exact location and number and shape of these keys is probably not of great importance they are preferably formed and located as shown, the key 8 on the outer side wall of each groove being nearest the mouth of the groove and the key 9 on the inner wall of each groove being set further back toward the base of the groove.

It is also of interest to note that the base portions 10 of each groove 2 and 3 in the metal strip 1 presented at the opposite inner and outer peripheral surfaces of the strip constitute thickened edges to act as wearing surfaces protecting the fibrous material and limiting and retarding the wear to which it is subjected.

Figure 6:
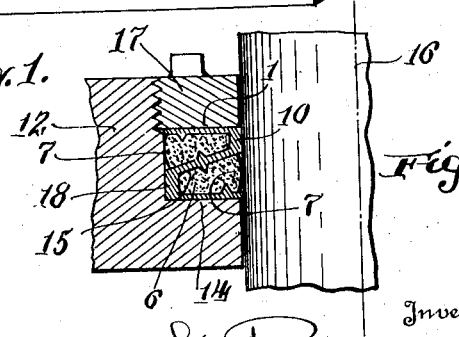
Figure 6 is a section on the axis of a stuffing box showing the packing in use.

Figure 6 is a fragmentary cross section through a gland or stuffing box containing the packing. In this figure the cylinder casting 12 is broken away around the stuffing box 14. This box is shown as containing the packing 15 held in position around the piston rod 16 by the packing nut 17 which nut is screwed down tightly against the packing causing the soft packing material 6 to bulge outwardly at 7. This soft material in the preferred form of the invention bulges outwardly from the groove to a greater or less degree in its normal condition when not compressed by the packing unit.

Important advantages of the invention are that this semi-metallic packing is so constructed that it is not seriously affected, i. e., subject to rapid deterioration due to the action of steam, air, water, acid, oil or any substance which is to come in contact with it. This is particularly due to the fact that the soft packing material is so encased in metal that the soft material is almost completely enclosed and protected so that it is only exposed on the inner and outer peripheral surfaces of the strip, where it contacts the piston rod on one side and on the other side contacts the cylindrical inner surface of the box or gland, preventing leakage at both points.

The manner of locking the soft packing in the grooves in the metal strip and the manner of enclosing it as shown, makes it absolutely impossible for the packing to blow out, the Z construction forming the double V grooves together with the keys forming a very efficient means for holding the soft packing in position. Further, when the strip is compressed in the stuffing box or gland, the compression being at right angles to the depth of the grooves the fibrous or other soft material 6 is forced by the wedge action of the tapered grooves 2 and 3 against the rod 16 on one side and the box wall 18 on the other forming a perfect seal at the front and rear, and as the wear is confined to the metal at 10 where it is preferably thickened the packing lasts almost indefinitely, and the use of relatively soft metal, as lead, or alloy in the construction of the strip gives at the same time little, if any, wear on the piston rod.

I have thus described specifically and in detail a piston rod packing embodying the features of my invention in the preferred form in order that the nature and the manner of constructing and using the same may be fully understood, however, the specific terms herein are used descriptively rather than in a limiting sense, the scope of the invention being defined in the claims.

What I claim as new and desire to secure by Letters Patent is:

1. A semi-metallic piston rod packing adapted to fit in the usual annular packing gland having inner and outer cylindrical surfaces, the packing comprising a metal strip of Z shaped cross section forming oppositely disposed tapered grooves of outwardly increasing dimension and soft packing in the grooves bulging outward slightly therefrom in the operative condition of the packing forming opposite inner and outer cylindrical wearing surfaces, each consisting of soft packing and metal, the soft packing being except as to said wearing surfaces completely enclosed by the metal and means for securing the soft packing in the grooves of the metal strip.

2. A semi-metallic piston rod packing adapted to fit in the usual annular packing gland having inner and outer cylindrical surfaces, the packing comprising a metal strip forming oppositely disposed tapered grooves of outwardly increasing dimension and a soft packing in the grooves forming inner and outer cylindrical wearing surfaces, each consisting of soft packing and metal, the soft packing being except for said wearing surfaces completely enclosed in said metal, the walls of the grooves being formed with keys to hold the soft packing in position.

3. A semi-metallic piston rod packing adapted to fit in the usual annular packing gland having inner and outer cylindrical walls, the said packing being in the form of a ring to encircle the piston rod, the ring comprising a metal strip having a groove in the inner peripheral surface, the same being tapered so that the cross section is of increasing width toward said surface, soft packing filling the groove, the soft packing being completely enclosed except for said inner peripheral surface, the walls of the groove being provided with a key surface to hold the packing in position.

4. A semi-metallic piston rod packing adapted to fit in the usual annular packing gland having inner and outer cylindrical walls, the said packing being in the form of a ring to encircle the piston rod, the ring comprising a metal strip having a groove on the inner peripheral surface, the same being tapered so that the cross section is of increasing width toward said surface, soft packing filling the groove, the walls being provided with a key surface to hold the packing in position, other soft packing suitably enclosed within the strip and presented at the outer peripheral surface, the soft packing and the edges of the metal bearing against said inner and outer cylindrical walls, the assembled packing being of substantially rectangular cross section having the other two opposite surfaces entirely of metal.

Signed by me at Baltimore, Md., this 3rd day of January, 1929.

GEORGE H. BAUSMAN.